(No Model.)
R. V. STOCKING.
WEED PULLER.
No. 332,169. Patented Dec. 8, 1885.
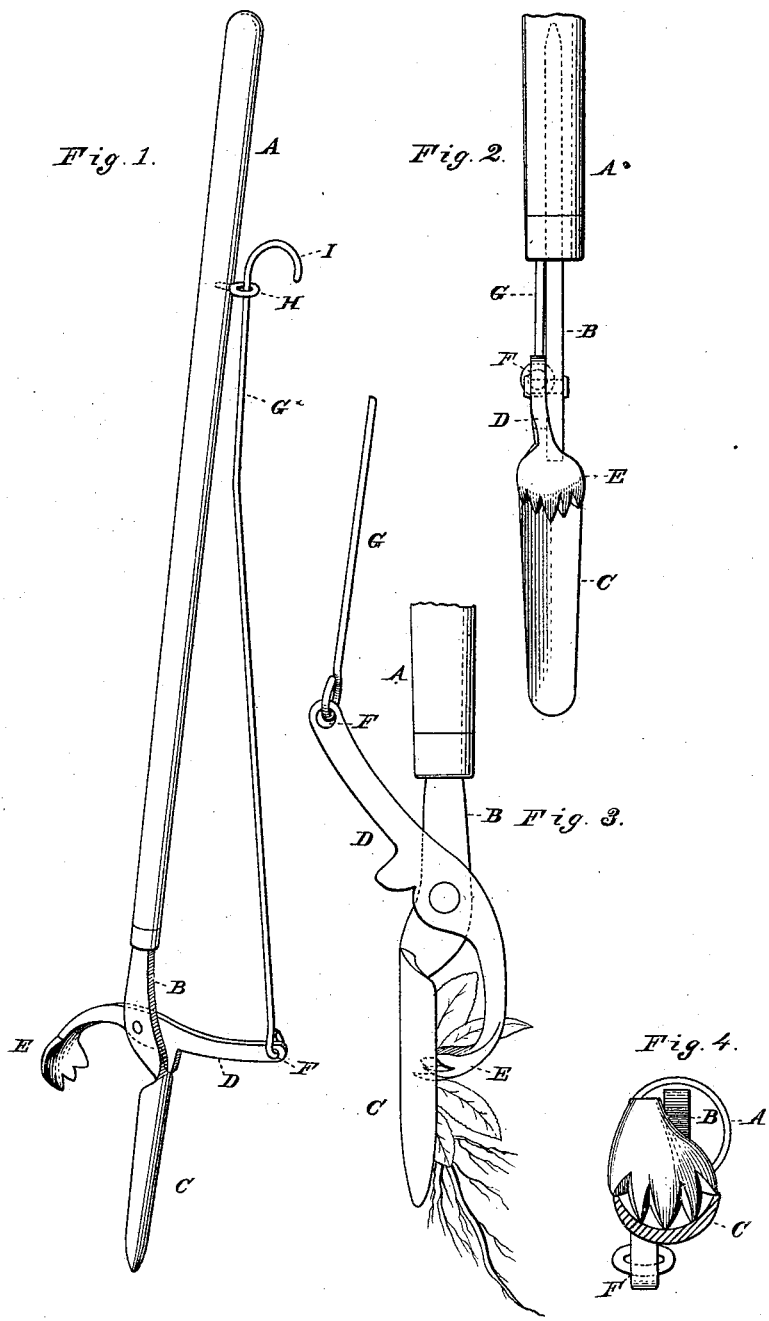
WITNESSES
Villette Anderson.
Philip C. Masi.
INVENTOR
R. V. Stocking,
by Anderson & Smith,
his ATTORNEYS

UNITED STATES PATENT OFFICE.

RANSLER V. STOCKING, OF MORRISON, ILLINOIS.

WEED-PULLER.

SPECIFICATION forming part of Letters Patent No. 332,169, dated December 8, 1885.

Application filed August 17, 1885. Serial No. 174,630. (No model.)

*To all whom it may concern:*

Be it known that I, RANSLER V. STOCKING, a citizen of the United States, residing at Morrison, in the county of Whiteside and State of Illinois, have invented certain new and useful Improvements in Weed-Pullers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a perspective view. Fig. 2 is a front view of the device as it would be open. The handle is broken off. Fig. 3 is a side view, the lever being closed upon the prong. Fig. 4 is a bottom view, the prong being shown in section This invention relates to weed-pullers; and it consists in the construction and novel combination of parts, as will be hereinafter fully described, and particularly pointed out in the claim.

Referring to the accompanying drawings by letter, A designates the handle, which is provided with a flat blade, B, at its lower end, which terminates in a chisel point or prong, C, which is arc-shaped in cross-section. To the flat blade B is pivoted a lever, D, having a twisted point, E. At its upper end the lever D has a hole, F, which is engaged by the lower end of a draw-rod, G, which works through an eye, H, projecting from the handle A, and is provided with a ring, I, at its upper end, which is to be grasped when it is desired to operate the lever D.

In operation the chisel-point is to be shoved into the ground from four to six inches at the root of the weed that is to be pulled, and the ground is loosened a little; then by pulling up on the draw-rod G the pivoted lever D will be shut down, and will clamp the weed, so that it can be readily pulled out of the ground, root and all. In this manner some of the noxious weeds may be eradicated which by other means cannot be.

The device is simple, and the operator can stand erect while using it, thus greatly lessening the labor of pulling weeds.

I am aware that it is not new to form a weed-puller with two similar blades having chisel-points, with one of the said blades connected with an operating-rod, and that blades of concavo-convex form in cross-section are not new, and therefore do not claim such devices, broadly.

Having thus fully described my invention, what I claim as new, and desire to secure by Letters Patent of the United States, is—

As an improved article of manufacture, a hand implement for pulling weeds, consisting of a handle having secured at one end a blade provided with a chisel-point, and concavo-convex in cross-section, a pivoted lever having a twisted and serrated free end arranged to turn in to the concavity of the said blade, and provided at its opposite end with a pull-rod to operate the same, substantially as specified.

In testimony whereof I affix my signature in presence of two witnesses.

RANSLER V. STOCKING.

Witnesses:
L. T. STOCKING,
FRANK D. RAMSAY.